United States Patent [19]
Cubbison, Jr.

[11] Patent Number: 4,706,281
[45] Date of Patent: Nov. 10, 1987

[54] DYNAMIC IMPEDANCE ELEMENT FOR A BATTERY FEED CIRCUIT

[75] Inventor: Richard J. Cubbison, Jr., Littleton, Colo.

[73] Assignee: American Telephone and Telegraph Company and AT&T Information Systems Inc., Holmdel, N.J.

[21] Appl. No.: 605,190

[22] Filed: Apr. 30, 1984

[51] Int. Cl.$^4$ .......................................... H04M 19/00
[52] U.S. Cl. .................................... 379/322; 379/398; 379/413; 333/17 R; 333/213; 330/104
[58] Field of Search ............................ 333/213, 17, 32; 179/16 F, 70, 77, 170 D, 170 NC, 16 AA, 170 R, 170 G, 18 FA; 330/103, 104; 379/398, 399, 405, 413, 324, 322, 338, 400, 340

[56] References Cited

U.S. PATENT DOCUMENTS

| | | | |
|---|---|---|---|
| 4,151,493 | 4/1979 | Lewandowski | 333/216 |
| 4,176,331 | 11/1979 | Forward et al. | 333/213 |
| 4,203,009 | 5/1980 | Tattersall | 179/16 AA |
| 4,203,012 | 5/1980 | Boxall | 179/170 NC |
| 4,272,656 | 6/1981 | Nishikawa | 179/170 NC |
| 4,358,644 | 11/1982 | Hubler | 179/170 NC |
| 4,358,645 | 11/1982 | Brown | 179/170 NC |
| 4,359,609 | 11/1982 | Apfel | 179/16 F |
| 4,363,008 | 12/1982 | Chambers, Jr. | 333/24 R |
| 4,419,542 | 12/1983 | Embree | 179/77 |
| 4,431,874 | 2/1984 | Zobel et al. | 179/170 NC |
| 4,514,595 | 4/1985 | Rosenbaum et al. | 179/16 F |
| 4,581,487 | 4/1986 | Cochran | 179/77 |

FOREIGN PATENT DOCUMENTS 1602130  11/1981  United Kingdom .............. 179/16 F

OTHER PUBLICATIONS

"A High-Voltage IC for a Transformerless Trunk and Subscriber Line Interface", Denis W. Aull et al., IEEE Journal of Solid-State Circuits, vol. SC-16, No. 4, Aug. 1981, pp. 261–266.

*Primary Examiner*—Gene Z. Rubinson
*Assistant Examiner*—R. Vaas
*Attorney, Agent, or Firm*—James M. Graziano

[57] ABSTRACT

Battery feed circuits function to supply a predetermined current to the communication pair and include circuitry to counteract the effects of balanced longitudinal signals which appear on the communication pair. Prior art battery feed circuits use either expensive matched power resistors or matched and tracking current sources to provide both the dc current and the necessary balance. The subject battery feed circuit separates the two functions: a pair of poorly matched inexpensive power resistors provide the basic dc current; and associated pair of low power electronic circuits supply compensation signals to provide the necessary balance. The compensation signals are applied to the power resistors in a manner to obtain precision resistor ($\pm 0.1\%$) characteristics from the inexpensive ($\pm 5\%$) power resistors.

7 Claims, 4 Drawing Figures

DYNAMIC IMPEDANCE ELEMENT FOR A BATTERY FEED CIRCUIT

FIELD OF THE INVENTION

The subject invention relates to battery feed circuits for communications purposes and, in particular, to an inexpensive electronic battery feed circuit which realizes a pair of high precision battery feed impedances by using two low precision battery feed resistors connected to electronic compensation circuits.

DESCRIPTION OF THE PRIOR ART

Battery feed circuits supply a current to a communication pair through two fixed impedances. One impedance connects a fixed negative battery voltage to the ring lead of the communication pair while the other impedance connects the tip lead of the communication pair to ground potential. The two fixed impedances must be very closely matched and achieving this match is a major problem in prior art battery feed circuits.

Prior art non-electronic battery feed circuits make use of passive battery feed resistors or transformers to supply both the fixed impedances and the current to the communication pair. The non-electronic battery feed circuits have a number of disadvantages: transformers occupy a substantial amount of space; to provide a precise impedance requires expensive matched resistors or expensive transformers; a significant amount of power is dissipated by these devices as the current flows through the fixed impedance thereby increasing the cost of these devices by requiring a single device to have both high precision and high power handling capacity.

Prior art electronic battery feed circuits attempt to reduce the amount of space required to implement the battery feed function yet suffer the cost penalties incurred in having a single device provide both high precision and high power handling capacity. In particular, prior art electronic battery feed circuits include current mirror arrangements wherein an extensive amount of electronic circuitry is used to directly control the current flow on the communication pair. The current mirror circuitry must dissipate a significant amount of power caused by controlling the current flow and providing the fixed impedance. The power loss causes a significant heat dissipation problem which increases the difficulty as well as the cost of implementing this circuitry in an integrated circuit package. Additionally, the current mirror circuit for both leads of the communication pair must track to provide longitudinal balance.

Another form of prior art electronic battery feed circuit makes use of current control transistors connected in series with precision battery feed resistors. This electronic circuitry improves the control of the battery feed current yet incurs a significant cost disadvantage because electronic circuitry is added to the expensive high power capacity precision battery feed resistors which are still required to provide a close match between the two fixed impedances on the communication pair. Thus, all known prior art battery feed circuits suffer from one or more of the disadvantages of high cost, inefficient use of space, heat dissipation problems or lack of precision.

SUMMARY OF THE INVENTION

The dynamic impedance element for an electronic battery feed circuit of the present invention solves the problems discussed above by making use of a pair of low precision impedance value, high power capacity battery feed resistors and two electronic impedance compensation circuits to realize a pair of high precision impedance value, low cost battery feed impedances.

This battery feed circuit separates the power dissipation function from the high precision impedance value function. The high power, low precision impedance value battery feed resistors provide an inexpensive approximation of the desired fixed impedance. The electronic compensation circuits generate a correction signal to compensate for impedance variations in the battery feed resistors. The use of low precision impedance value, high power capacity battery feed resistors reduces the cost of this circuit and enables the associated electronic compensation circuits to be packaged in an integrated circuit housing since most of the power is dissipated in the low precision impedance value battery feed resistors. The low power electronic compensation circuits only correct impedance variations in the associated battery feed resistors and need not dissipate much power.

Each electronic compensation circuit consists of an operational amplifier circuit which senses both the current flow through the associated battery feed resistor as well as the voltage on the communication pair and from this calculates the actual impedance value of the battery feed circuit. Where this actual impedance value deviates from the desired fixed impedance value, the electronic compensation circuit generates a relatively low power signal which is applied to the communication pair to compensate for the impedance difference. The addition of this correction signal provides a battery feed impedance which is the required fixed impedance to a high degree of precision. The simplicity of this arrangement as well as the division of the impedance control and power dissipation functions not only reduces the cost of implementation but improves the efficiency of the circuit without incurring a complexity or cost disadvantage.

DETAILED DESCRIPTION

Battery feed circuits function to supply a predetermined current to a communication pair through a fixed impedance. The predetermined current is provided to the communication pair in differential fashion, that is, current is applied to one lead of the communication pair while an equal amount of current is removed from the other lead of the communication pair.

The implementation of such a function appears to be easy to accomplish. However, the requirements imposed on this function by the needs of telephone communications make such a function fairly difficult to realize in an economical fashion. The fixed impedance is typically realized in the form of two separate and identical impedances which are connected between a respective lead of the communication pair and the source or sink of the desired current. These two impedances must not only be equal in value but must also track each other to achieve the required longitudinal balance. The longitudinal balance requirement is the most difficult to attain for battery feed circuits since the variation between the impedances must not exceed 0.1%. Thus, the two impedances must not only be equal but must also operate in synchronization, tracking each other in value over a wide range of temperature and humidity conditions and throughout the whole life cycle of these devices.

Figure 2:
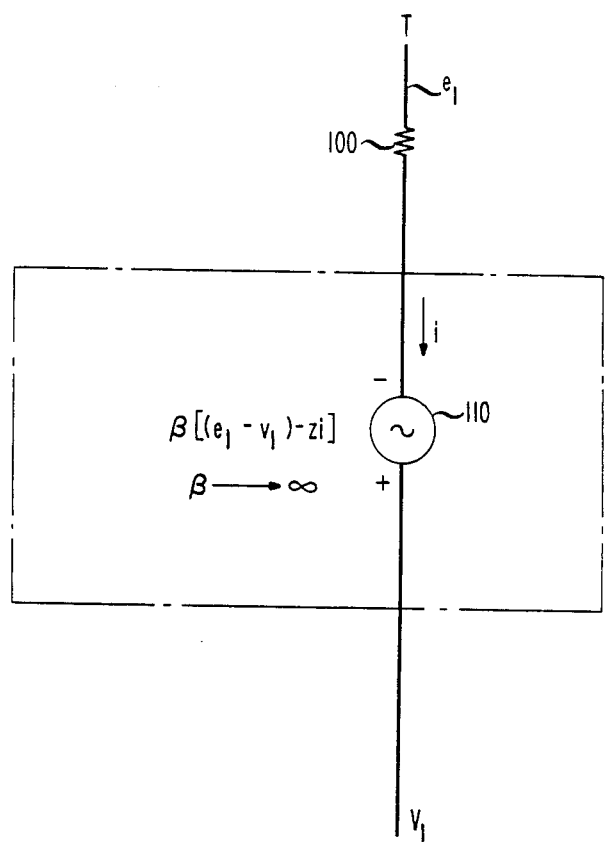
FIG. 2 illustrates a simple block diagram structure which represents the function performed by the subject battery feed circuit.

FIG. 2 illustrates the basic architecture of the subject dynamic impedance element for a battery feed circuit in its simplest form as the current sink half of the pair of impedances which must be realized to provide battery feed function. The other impedance is the current source half and is a mirror image of that illustrated in FIG. 2 and is connected between the other lead of the communication pair and the current source terminal. $V_1$ is usually ground potential.

This dynamic impedance element for a battery feed circuit consists of an inexpensive fixed battery feed resistor 100 which has a relatively poor impedance tolerance characteristic (±5%) while having an excellent power dissipation characteristic. The other element connected in series with fixed resistor 100 is a voltage controlled voltage source 110 which generates an error signal to compensate for the poor impedance tolerance characteristic of fixed resistor 100. Therefore, fixed resistor 100 provides the power dissipation and impedance approximation function while the low power voltage controlled voltage source 110 supplies a correction signal which counteracts the impedance inaccuracies of fixed resistor 100.

The resultant circuit is not only inexpensive, but also presents a high precision battery feed impedance from lead T to voltage source terminal $V_1$. Voltage controlled voltage source 110 has the operating characteristic identified on FIG. 2 as: $\beta((e_1-V_1)-Zi)$ where beta approaches infinity and Z is the desired impedance from lead T to voltage source terminal $V_1$. This operating characteristic represents the difference between the actual measured impedance of fixed resistor 100 and the desired or nominal value Z of the impedance of resistor 100. Voltage controlled voltage source 110 generates an error signal in response to this comparison to counteract the measured inaccuracy. The term $(e_1-V_1)$ is an indication of the actual voltage across the battery feed circuit as measured between the T lead of the communication pair and voltage source $V_1$. The Zi term indicates the actual current through fixed resistor 100 multiplied by the desired impedance value for the resulting impedance between lead T and voltage source terminal $V_1$. Thus, the actual voltage across the battery feed circuit is compared with the voltage across an ideal fixed battery feed resistor Z, and voltage controlled voltage source 110 provides a voltage output to reduce the difference between these two terms to zero. This results in the battery feed circuit providing the exact impedance characteristic required for the battery feed application.

To elaborate, the voltage appearing on lead T is $e_1$. This voltage is equal to the supply voltage $V_1$ plus the voltage across the battery feed circuit, which ideally would be the nominal impedance (Z) multiplied by the actual current flowing through the battery feed circuit (i). Thus, $e_1 = V_1 + Zi$ for the ideal case. However, if the actual impedance differs from the nominal value by z, then $e_1 = V_1 + (Z-z)i$. The error in expected voltage caused by this impedance variation is zi. Therefore voltage controlled voltage source 110 exactly compensates for this impedance variation by producing an error signal of $-zi$, which error signal is equal to the measured impedance variation multiplied by the actual current flowing through the battery feed circuit.

Figure 3:
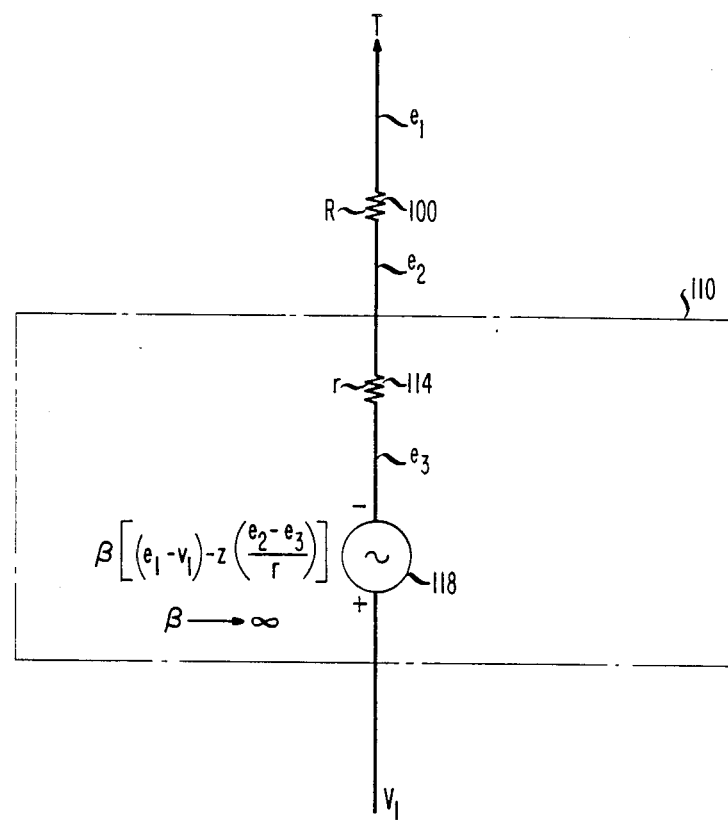
FIG. 3 illustrates an extension of the block diagram of FIG. 2.

There are numerous ways of realizing voltage controlled voltage source 110. To provide the actual measurement of the current flowing through fixed resistor 100 (having a nominal impedance value of R±5%), some sense circuitry is required. FIG. 3 illustrates how such a function can be realized. Resistor 114 is a low impedance value (r), high precision impedance value resistor (±0.1%). Resistors R and r should be chosen such that R is greater than r and such that $R+r \cong Z$ where Z is the desired impedance. Resistor 114 will not dissipate much power since it is a low impedance yet the voltage across this precision resistor ($e_2-e_3$) will provide a very accurate indication of the actual current (i) flowing through fixed resistor 100. Thus, voltage ($e_2-e_3$) provides voltage controlled voltage source 118 of FIG. 3 with an accurate indication of the actual current flowing through fixed resistor 100. In FIG. 3 the operating characteristic associated with voltage controlled voltage source 118 has been modified to indicate the realization of this current sensing function:

$$\beta\left((e_1 - V_1) - Z\left(\frac{e_2 - e_3}{r}\right)\right)$$

Figure 4:
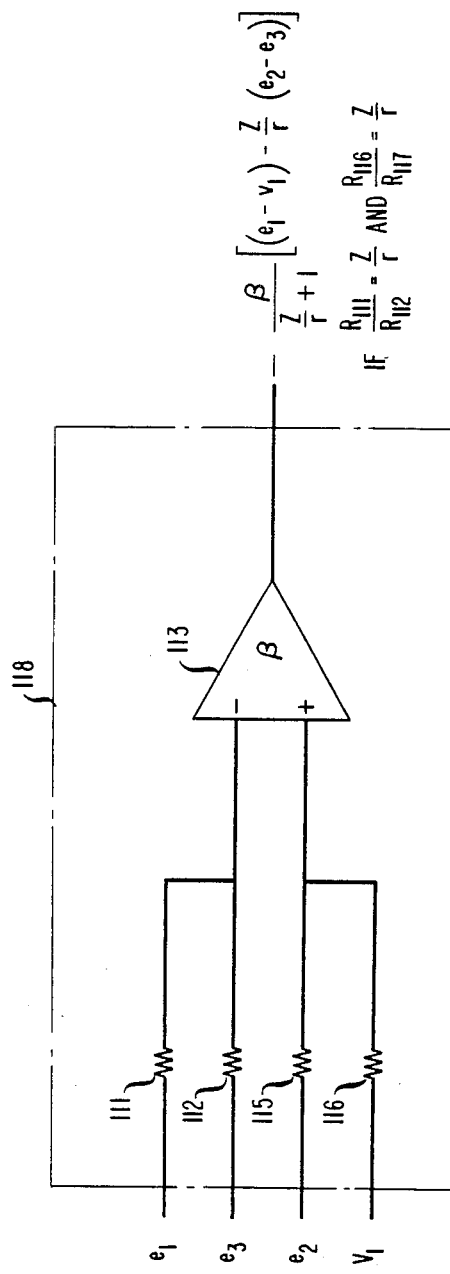
FIG. 4 illustrates a specific implementation of the voltage controlled voltage source shown in FIG. 3.

The remaining portion of the compensation circuit is illustrated in FIG. 4 wherein voltage controlled voltage source 118 itself is realized by an operational amplifier circuit. Operational amplifier 113 provides the actual amplification function of beta while the various input resistors (111, 112, 115, 116) supply the voltage sensing functions. The desired output is obtained from the operational amplifier 113 if:

$$\frac{R_{111}}{R_{112}} = \frac{R_{116}}{R_{115}} = \frac{Z}{r} \quad (2)$$

The actual values selected for these resistors (111, 112, 115, 116) should be large enough to ignore their loading effects on $e_1$, $e_2$ and $e_3$. Loading can however be compensated for by a more complicated relationship between the resistors.

Figure 1:
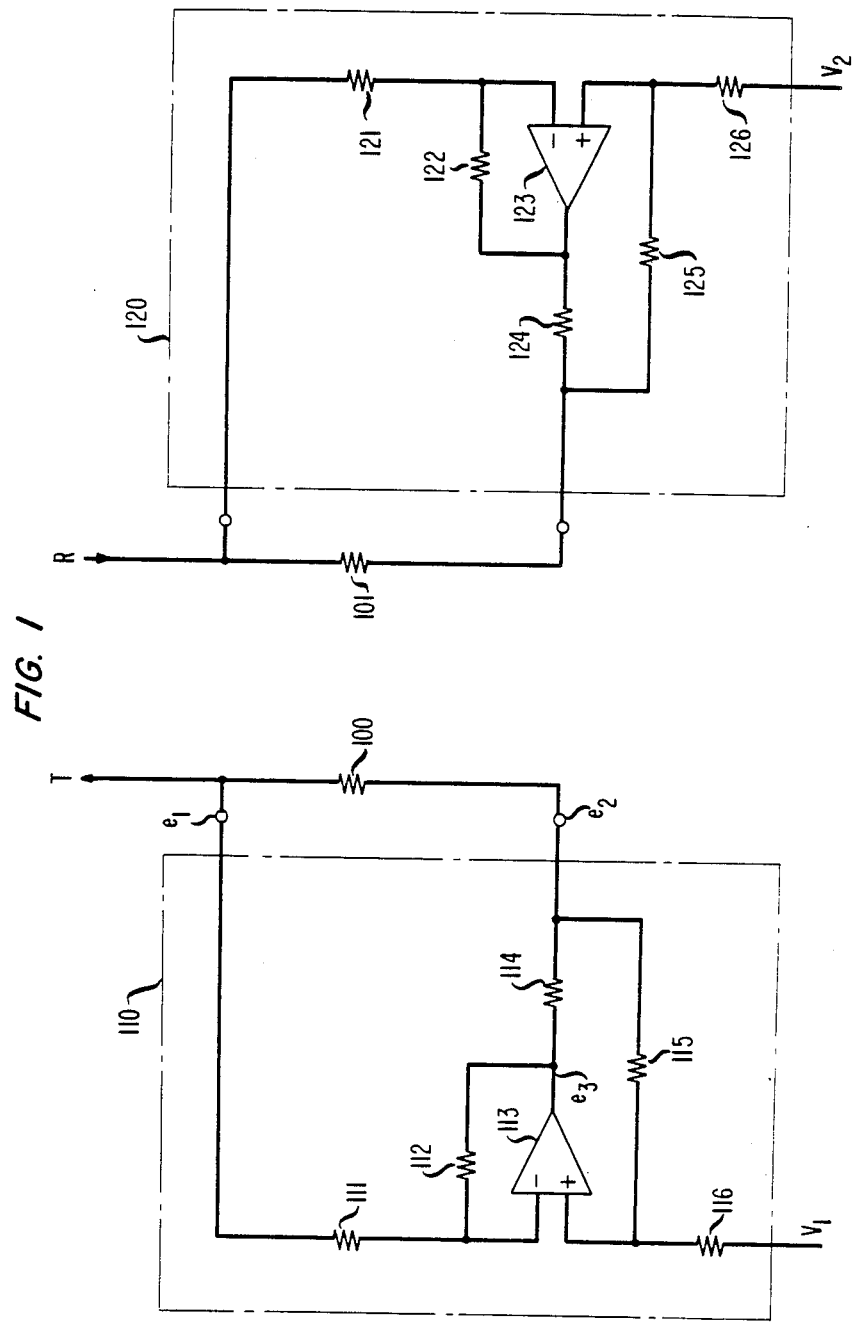
FIG. 1 illustrates the subject dynamic impedance element for a battery feed circuit.

The combination of these various elements into a single circuit is illustrated on the left side of FIG. 1 and represents the above-described dynamic impedance element for a battery feed circuit. An equal and identical circuit is shown on the right side of FIG. 1 connected between the other lead of the communication pair and the battery terminal $V_2$ which provides the battery source function. $V_1$ is normally ground potential. These respective battery feed impedances respond to the actual voltage and actual current conditions on the communication pair and therefore, need not have their respective operations synchronized since each circuit will independently track the actual conditions on the communication pair. It is obvious that such a pair of battery feed circuits should be implemented in a single integrated circuit package so that temperature, humidity and device aging characteristics will automatically track in both circuits.

It should be obvious that while a voltage controlled voltage source implementation of the dynamic impedance element is disclosed, a current controlled voltage source, voltage controlled current source or current controlled current source implementation can be realized by the application of Norton's or Thevenin's theorems of equivalent sources.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. An impedance circuit connected between a communication lead (T) and a power source ($V_1$) for providing a fixed impedance value (Z) between said communication lead (T) and said power source ($V_1$), comprising:

impedance means (100) of nominal impedance R, having a first and a second terminal, said first terminal being connected to said communication lead (T); and active compensation means (110) connected to said first terminal and between said second terminal and said power source ($V_1$) and responsive to the actual impedance of said impedance circuit as measured between said communication lead (T) and said power source ($V_1$) for applying a compensation signal to said impedance means (100) of magnitude to modify the impedance of said impedance circuit as measured between said communication lead (T) and said power source ($V_1$) to equal said fixed impedance value (Z) by offsetting any deviation in the impedance of said impedance means (100) from said nominal impedance R.

2. The impedance circuit of claim 1 wherein said active compensation means (110) includes:

current sense means (112-115) connected between said second terminal and said power source for measuring the current flowing through said impedance means (100) to said communication lead; and voltage sense means (111, 113, 116) connected between said communication lead and said power source for measuring the voltage between said communication lead and said power source.

3. The impedance circuit of claim 2 wherein said active compensation means (110) includes:

voltage source means (113) connected to said current sense means (112-115) and said voltage sense (111, 113, 116) means and responsive to both said measured voltage and said measured current for applying said compensation signal to said impedance means (100).

4. The impedance circuit of claim 2 or 3 wherein said active compensation means (112-115) includes:

precision value impedance means (114) connected between said second terminal and said power source for providing a low impedance, high precision impedance value path for said current flowing through said impedance means (100) of nominal impedance R to said communication lead.

5. An impedance circuit connected between a communication lead (T) and a power source ($V_1$) for providing a fixed impedance (Z) between said communication lead (T) and said power source ($V_1$), comprising:

impedance means (100) of nominal impedance R, having a first and a second terminal, said first terminal being connected to said communication lead (T); and active compensation means (110) connected to said communication lead (T) and between said second terminal and said power source ($V_1$), and responsive to both the current flowing through said impedance means (100) to said communication lead (T) and the voltage between said communication lead (T) and said power source ($V_1$) for applying a compensation signal to said impedance means (100) of magnitude to force said current and said voltage to values identical to those for an impedance means (100) having an impedance value equal to said fixed impedance (Z) by offsetting any deviation in the impedance of said impedance means (100) from said nominal impedance R.

6. An impedance circuit connected between a communication lead and a power source for providing a high precision impedance value, high power capacity, fixed impedance (Z) comprising:

high power capacity, low precision impedance value means (100) having a first and a second terminal, said first terminal being connected to said communication lead;

low power capacity, high precision impedance value means (110) connected to said communication lead and between said second terminal and said power source for dynamically providing an impedance between said second terminal and said power source of value equal to the difference between said high power capacity, low precision impedance value means (100) and said fixed impedance (Z);

wherein said low power, high precision impedance value means (110) includes:

means (111-116) responsive to the difference in impedance between said fixed impedance (Z) and said high power capacity, low precision impedance value means (100) for applying a compensation signal proportional to said difference to said communication lead;

wherein said applying means (111-116) includes:

current sense means (112-114, 115) connected between said second terminal and said power source for measuring the current flowing through said high power capacity, low precision impedance value means to said communication lead; and voltage sense means (111, 113, 116) connected between said communication lead and said power source for measuring the voltage between said communication lead and said power source.

7. The impedance circuit of claim 6 wherein said applying means includes:

means (113) connected to said current sense means (112, 114-115) and said voltage sense means (111, 116) and responsive to said voltage and said current for generating said compensation signal representative of the difference between said fixed impedance (Z) and the impedance determined from said voltage and said current.

* * * * *